United States Patent [19]

Nakajima et al.

[11] Patent Number: 4,693,221
[45] Date of Patent: Sep. 15, 1987

[54] ENGINE CONTROL SYSTEM

[75] Inventors: Yuji Nakajima, Yokosuka; Akito Yamamoto, Yokohama, both of Japan

[73] Assignee: Nissan Motor Company, Limited, Yokohama, Japan

[21] Appl. No.: 891,168

[22] Filed: Jul. 31, 1986

[30] Foreign Application Priority Data

Sep. 5, 1985 [JP] Japan ................... 60-194877

[51] Int. Cl.$^4$ ..................... F02P 5/15; F02P 11/00
[52] U.S. Cl. .................. 123/425; 364/431.08
[58] Field of Search ............ 123/425, 435, 479; 73/35; 364/431.08, 431.11

[56] References Cited

U.S. PATENT DOCUMENTS

| 4,131,097 | 12/1978 | Sawada et al. | 123/425 |
|---|---|---|---|
| 4,153,019 | 5/1979 | Laubenstein et al. | 123/425 |
| 4,320,729 | 3/1982 | Sawada et al. | 123/425 |
| 4,331,117 | 5/1982 | Ginsburgh | 123/425 |
| 4,356,551 | 10/1982 | Iwase et al. | 123/425 X |
| 4,357,919 | 11/1982 | Hattori et al. | 123/425 |
| 4,462,362 | 7/1984 | Bonitz et al. | 73/35 X |

FOREIGN PATENT DOCUMENTS

| 56429 | 5/1978 | Japan | |
| 135365 | 7/1984 | Japan | 123/425 |
| 120780 | 7/1984 | Japan | 123/425 |

Primary Examiner—Tony M. Argenbright
Attorney, Agent, or Firm—Schwartz, Jeffery, Schwaab, Mack, Blumenthal & Evans

[57] ABSTRACT

In an internal combustion engine, a spark timing control device adjusts spark timing in accordance with detected value of vibration in combustion pressure. A sensor detects vibration in combustion pressure within the engine. The detected combustion pressure vibration is converted into a correlation value relating to combustion condition of the engine. The current correlation value is compared to a reference value corresponding to the correlation value which was obtained during idling operation of the engine. This comparison is to determine whether or not a malfunction of the spark timing control device occurs. The spark timing is controlled in accordance with the detected combustion pressure vibration and also with the determination as to whether or not a malfunction of the spark timing control device occurs.

7 Claims, 11 Drawing Figures

ENGINE CONTROL SYSTEM

BACKGROUND OF THE INVENTION

1. Field of the Invention

This invention relates to an engine control system, and in particular to a spark timing control system for an internal combustion engine.

2. Description of the Prior Art

Japanese patent publication No. 53-56429 discloses an engine control system which adjusts spark timing in accordance with pressure within a combustion chamber or cylinder. Specifically, a pressure sensor detects the cylinder pressure. The peak of cylinder pressure is derived from the detected cylinder pressure. The spark timing is controlled in accordance with the derived peak pressure so that the cylinder pressure is limited to a predetermined level at which emission of nitrogen oxides (NOx) and hydrocarbon (HC) is acceptable, This system has no fail safe section against damage to the pressure sensor or damage to the elecrical connection to the pressure sensor. Accordingly, if such damage occurs, the spark timing is out of control.

SUMMARY OF THE INVENTION

It is an object of this invention to provide a safe spark timing control system for an engine.

According to this invention, in an internal combustion engine, a spark timing control device adjusts spark timing in dependence on detected value of vibration in combustion pressure. A sensor detects vibration in combustion pressure within the engine. The detected combustion pressure vibration is converted into a correlation value relating to combustion condition of the engine. The current correlation value is compared to a reference value corresponding to the correlation value which was obtained during idling operation of the engine. This comparison is to determine whether or not a malfunction of the spark timing control device occurs. The spark timing is controlled in accordance with the detected combustion pressure vibration and also with the determination as to whether or not a malfunction of the spark timing control device occurs.

DESCRIPTION OF THE PREFERRED EMBODIMENT

Figure 1:
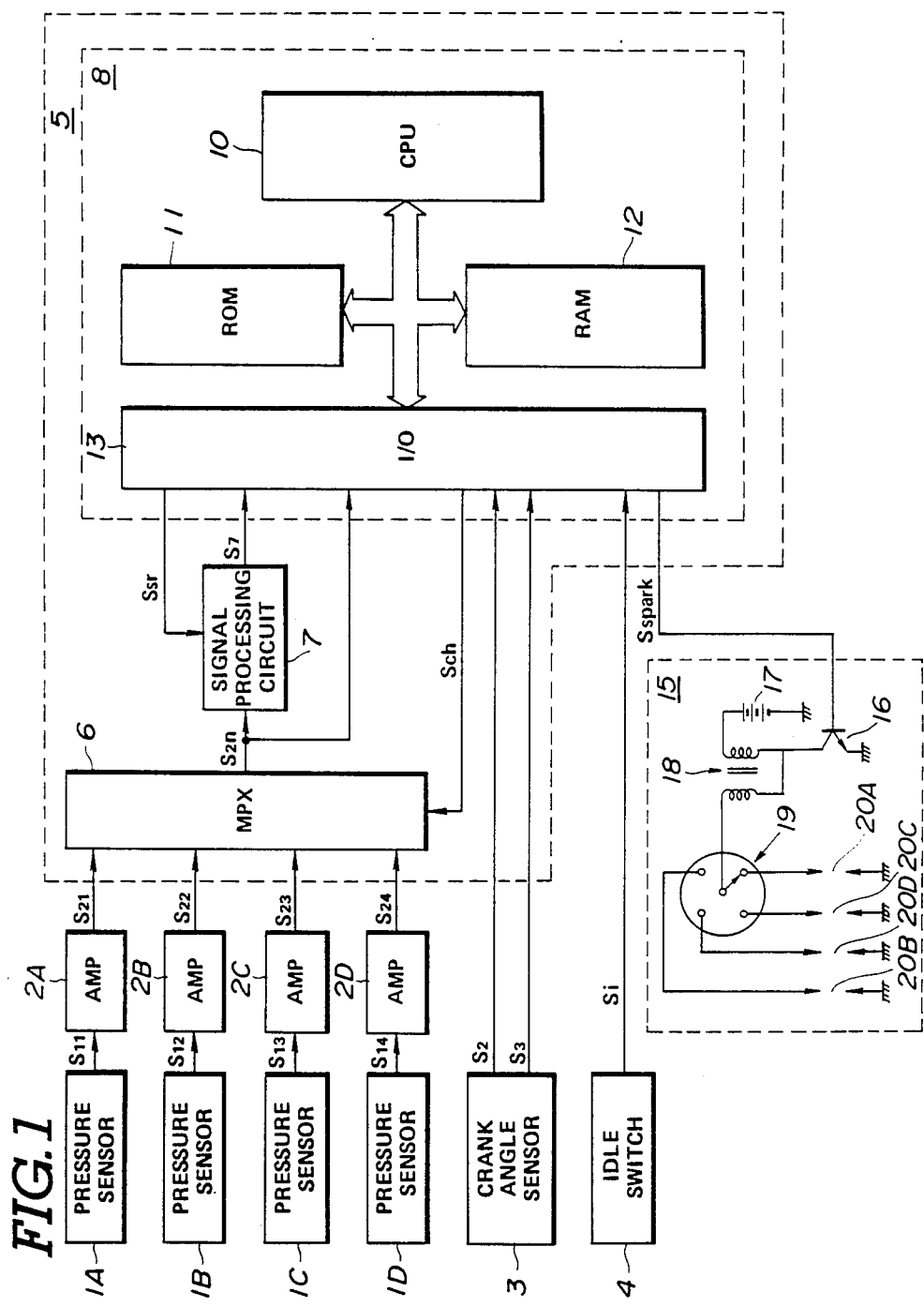
FIG. 1 is a diagram of an engine control system according to an embodiment of this invention.

With reference to FIG. 1, a spark timing control system for a four-cylinder engine includes pressure sensors 1A, 1B, 1C, and 1D detecting pressures within engine cylinders #1, #2, #3, and #4 respectively.

Figure 2:
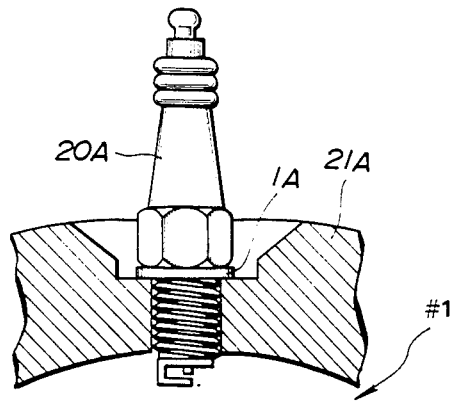
FIG. 2 is a sectional view of an engine cylinder head to which a pressure sensor is attached together with a spark plug.
Figure 3:
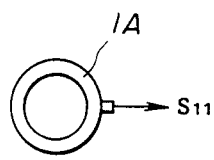
FIG. 3 is a top view of the pressure sensor of FIG. 2.

As shown in FIGS. 2 and 3, the pressure sensor 1A is in the form of a washer, fixedly sandwiched between the polygon section of a spark plug 20A and the section of a cylinder head 21A immediately above the engine cylinder #1. The pressure sensor 1A includes a piezoelectric element. The piezoelectric element is exposed to a force resulting from the pressure within the engine cylinder #1, so that it is electrically polarized in accordance with the pressure within the engine cylinder #1. The pressure sensor 1A generates an electric charge signal S11 which varies as a function of the pressure within the engine cylinder #1.

The other pressure sensors 1B, 1C, and 1D are similar to the pressure sensor 1A except for locations. The pressure sensors 1B, 1C, and 1D are placed immediately above the engine cylinders #2, #3, and #4 respectively. Accordingly, the pressure sensors 1B, 1C, and 1D generate electric charge signals S12, S13, and S14 which depend on the pressures within the engine cylinders #2, #3, and #4 respectively.

It should be noted that vibration sensors fixed to the engine cylinder block may be used instead of the washer-shaped pressure sensors.

Figure 5:
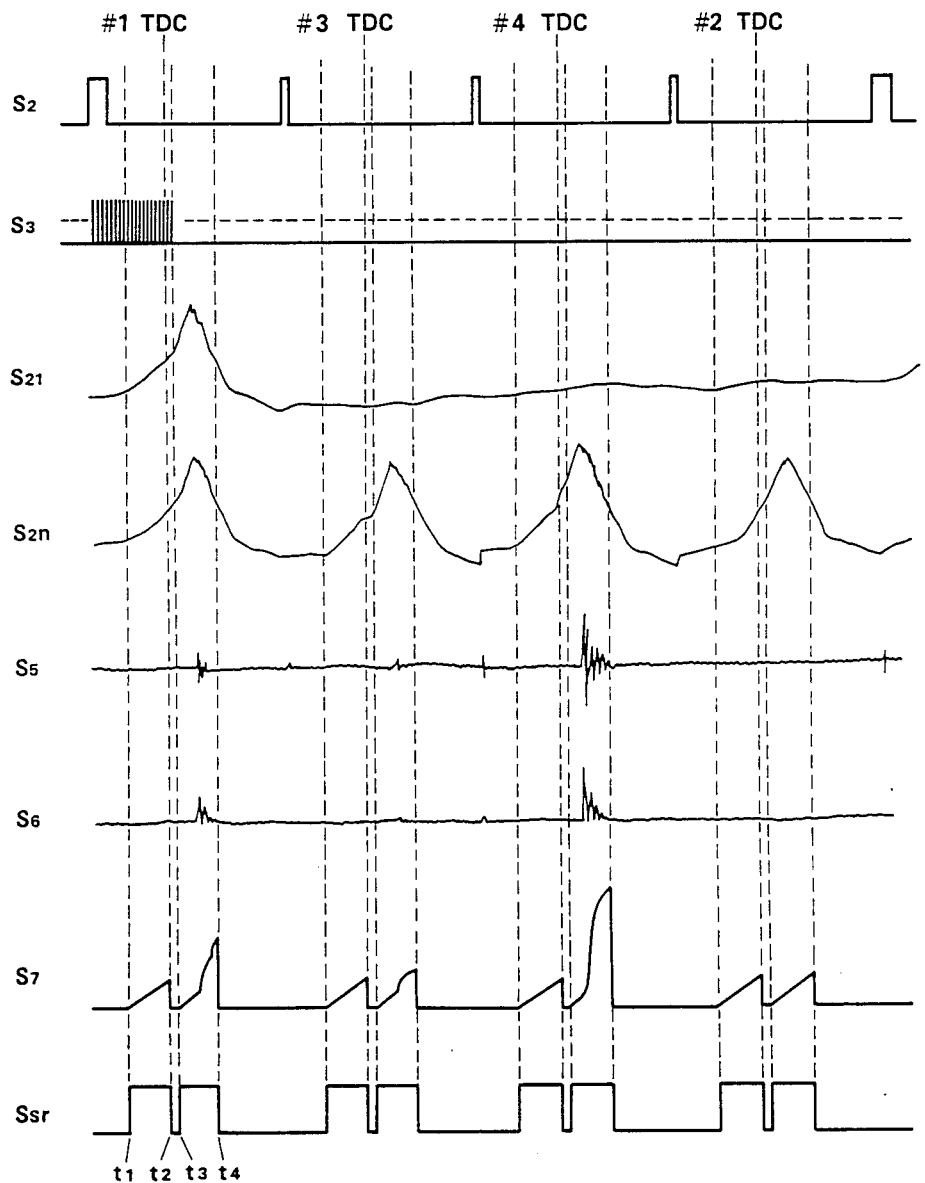
FIG. 5 are timing diagrams or waveforms of signals generated in the engine control system of FIG. 1.

As shown in FIG. 1, amplifiers 2A, 2B, 2C, and 2D derive voltage signals S21, S22, S23, and S24 from the electric charge signals S11, S12, S13, and S14 respectively. The voltages of the signals S21-S24 increase with the pressures within the engine cylinders #1-#4 respectively. The waveform of the pressure signal S21 is shown in FIG. 5.

A crank angle sensor 3 generates a reference pulse S2 at a crank angle 70° before the top dead center (BTDC) on the compression stroke of each engine cylinder. As shown in FIG. 5, the duration of the reference pulse S2 for the engine cylinder #1 is longer than the duration of the reference pulses S2 for the other engine cylinders #2-#4. The crank angle sensor 3 also generates a position pulse S3 each time the engine crankshaft rotates through 1° or 2°. The position pulses S3 are shown in FIG. 5.

A switch 4 connected to the engine throttle valve generates a signal Si representing whether or not the engine is idling.

A control unit 5 includes a multiptlexer (MPX) 6, a signal processing circuit 7, and a main control circuit 8.

The multiplexer 6 selects one of the pressure signals S21-S24 sequentially in accordance with a channel selection signal Sch issued from the main control circuit 8. The sequence of selection of the pressure signals corresponds to the spark order for the engine cylinders. The selected signal is passed to the signal processing circuit 7. In this way, the output signal S2n from the multiplexer 6 to the signal processing circuit 7 consists of the selected signals. The waveform of the multiplex signal S2n is shown in FIG. 5.

The signal processing circuit 7 derives a signal S7 representative of engine combustion condition and engine knock from the multiplex signal S2n as will be made clear hereinafter. It should be noted that the signal S7 also represents the level of background noise as will be made clear hereinafter.

The main control circuit 8 includes a digital microcomputer having the combination of a central processing unit (CPU) 10, a read-only memory (ROM) 11, a random-access memory (RAM) 12, and an input/outptut (I/O) circuit 13. The I/O circuit 13 includes analog-to-digital (A/D) convertors.

The I/O circuit 13 receives the multiplex signal S2n, the reference crank angle signal S2, the crank position signal S3, the idle signal Si, and the knock-related signal S7. The I/O circuit 13 outputs the channel selection signal Sch to the multiplexer 6 and also a set-reset signal Ssr to the signal processing circuit 7. In addition, the I/O circuit 13 outputs a spark control signal Sspark.

An ignition device 15 receiving the spark control signal Ssptark generates sparks within the engine cylinders sequentially. As will be made clear hereinafter, the timing of spark is adjusted in accordance with the spark control signal Sspark.

The main control circuit 8 derives the channel selection signal Sch from the reference crank angle signal S2. The channel selection signal Sch allows the multiplexer 6 to pass the pressure signal relating to the engine cylinder which is currently exposed to combustion. The spark order for the engine cylinders is "#1-#3-#4-#2", so that the sequence of selection of the pressure signals by the multiplexer 6 is "S21-S23-S24-S22".

Figure 4:
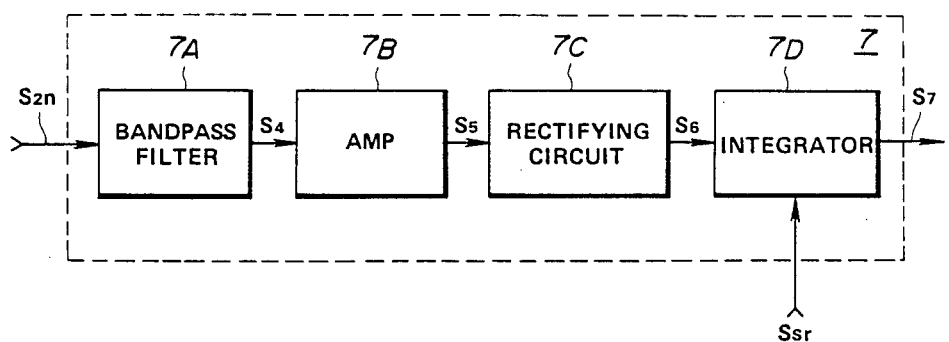
FIG. 4 is a block diagram of the internal structure of the signal processing circuit of FIG. 1.

As shown in FIG. 4, the signal processing circuit 7 includes a band pass filter 7A receiving the multiplex signal S2n. The band pass filter 7A abstracts knock-related components from the multiplex signal S2n. Specifically, the components of the multiplex signal S2n having frequencies in the range of approximately 6–17 KHz are allowed to pass through the filter 7A. The components of the multiplex signal S2n having other frequencies are cut off by the filter 7A. The band pass filter 7A outputs a signal S4.

The output signal S4 from the band pass filter 7A is magnified by an amplifier 7B. The amplifier 7B outputs a signal S5. The waveform of the signal S5 is shown in FIG. 5.

The output signal S5 from the amplifier 7B is processed by a half-wave rectification circuit 7C. This circuit 7C outputs a rectified signal S6. The waveform of the signal S6 is shown in FIG. 5.

The output signal S6 from the rectification circuit 7C is integrated by an integrator 7D. The integrator 7D outputs a signal S7. The waveform of the signal S7 is shown in FIG. 5. The integrator 7D is set and reset by a control signal Ssr issued from the main control circuit 8. The waveform of the set-reset signal Ssr is shown in FIG. 5.

The main control circuit 8 derives the integrator set-reset signal Ssr from the reference crank angle signal S2 and the crank position signal S3. The main control circuit 8 includes a counter within the I/O circuit 13 which receives the reference crank angle signal S2 and the crank angle position signal S3. When the reference crank angle pulse S2 is applied to the counter, the latter starts to count the crank position pulses S3. Accordingly, an output signal from this counter represents the current crank angle position for each engine cylinder. The main control circuit 8 derives the current crank angle position from this signal outputted by the counter.

As shown in FIG. 5. at a crank angle t1 for each engine cylinder, the main control circuit 8 changes the set-reset signal Ssr to a high level state "H" so that the integrator 7D starts to integrate the output signal S6 from the rectification circuit 7C. The main control circuit 8 keeps the set-reset signal Ssr at the high level state "H" and thus the integrator 7D continues the integration until a crank angle t2 for the engine cylinder. At the crank angle t2, the main control circuit 8 changes the set-reset signal Ssr to a low level state "L" so that the integrator 7D is reset by the set-reset signal Ssr. The main control circuit 8 keeps the set-reset signal Ssr at the low level state "L" and thus the integration by the inegrator 7D remains suspended for an crank angle interval between the crank angle t2 and a crank angle t3 for the engine cylinder. At the crank angle t3, the main control circuit 8 changes the set-reset signal Ssr to the high level state "H" so that the integrator 7D starts to integrate the output signal S6 from the rectification circuit 7C. The main control circuit 8 keeps the set-reset signal Ssr at the high level state "H" and thus the integrator 7D continues the integration until a crank angle t4 for the engine cylinder. At the crank angle t4, the main control circuit 8 changes the set-reset signal Ssr to the low level state "L" so that the integrator 7D is reset by the set-reset signal Ssr. The main control circuit 8 keeps the set-reset signal Ssr at the low level state "L" and the integration by the integrator 7D remains suspended for an crank angle interval between the crank angle t4 and a crank angle t1 for the subsequent engine cylinder.

The crank angle positions t1 and t2 are chosen so that the interval therebetween resides out of a range in which an engine knock occurs. Accordingly, the voltage of the signal S7 at a moment equal to or immediately prior to the crank angle t2 represents the level of background noise, that is, the intensity of components unrelated to engine knock. In addition, the interval between the crank angle positions t1 and t2 is chosen so that the voltage of the signal S7 during this interval is not affected by vibrations resulting from seating and unseating of cylinder inlet and outlet valves. For example, the crank angle position t1 precedes the top dead center on the compression stroke of each engine cylinder by a crank angle of 40°. In other words, the crank angle position t1 is 40° before the top dead center (BTDC 40°) on the compression stroke of each engine cylinder. The crank angle position t2 is equal to the top dead center (TDC) on the compression stroke of each engine cylinder. The crank angle positions t3 and t4 are chosen so that an engine knock occurs during the interval between these positions. Accordingly, the voltage of the signal S7 at a moment equal to or immediately prior to the crank angle position t4 represents the intensity of engine knock. In addition, the interval between the crank angle positions t3 and t4 is chosen so that the voltage of the signal S7 during this interval is not affected by vibrations resulting from seating and unseating of the cylinder inlet and outlet valves. For example, the crank angle position t3 follows the top dead center on the compression stroke of each engine cylinder by a crank angle of 5°. In other words, the crank angle position t3 is 5° after the top dead center (ATDC 5°) on the compression stroke of each engine cylinder. The crank angle position t4 follows the top dead center on the compression stroke of each engine cylinder by a crank angle of 45°. In other words, the crank angle position t4 is 45° after the top dead center (ATDC 45°) on the compression stroke of each engine cylinder.

The main control circuit 8 samples the output signal S7 from the signal processing circuit 7 at the top dead center on the compression stroke of each engine cylinder. The sampled signal S7 representative of the background noise level is converted into a corresponding digital signal which is stored in a section of the RAM 12 denoted by a preset address. The background noise level is represented by a variable B within the digital section of the main control circuit 8.

The main control circuit 8 samples the output signal S7 from the signal processing circuit 7 at a crank angle 45° after the top dead center on the compression stroke of each engine cylinder. The sampled signal S7 representative of the engine knock level is converted into a corresponding digital signal which is stored in a section of the RAM 12 denoted by a preset address. The engine knock level is represented by a variable K within the digital section of the main control circuit 8.

The main control circuit 8 calculates the ratio between the background noise level B and the engine knock level K, e.g., the ratio K/B. The main control circuit 8 detects whether or not engine knock occurs on the basis of the ratio between the values B and K. The spark control signal Sspark is adjusted in accordance with whether or not engine knock occurs. It should be noted that the ratio between the current eninge knock level K and its historical average value Kave, e.g., the ratio K/Kave, may be used in place of the ratio between the values B and K.

The ignition device 15 includes a power transistor 16. The collector-emitter path of the power transistor 16 is connected in series with a battery 17 and the primary winding of an ignition coil 18. The base of the power transistor 16 receives the spark control signal Sspark issued from the main control circuit 8. The power transistor 16 switches in accordance with the spark control signal Sspark, interrupting and allowing the flow of an electrical current through the primary winding of the ignition coil 18. One end of the secondary winding of the ignition coil 18 is connected to an end of the primary winding of the ignition coil 18. The other end of the secondary winding of the ignition coil 18 is connected to a rotatable contact of a distributor 19 which can move into and out of contact with fixed contacts of the distributor 19. Spark plugs 20A, 20B, 20C, and 20D for the engine cylinders #1, #2, #3, and #4 are connected to the fixed contacts of the distributor 19 respectively. The spark plugs 20A-20D are also connected to the secondary winding of the ignition coil 18 via the collector-emitter path of the power transistor 16.

High potentials are induced across the secondary winding of the ignition coil 18 in accordance with the switching operation of the power transistor 16 which is controlled by the spark control signal Sspark. These high potentials are distributed via the element 19 to the spark plugs 20A-20D sequentially, generating sparks across the spark plugs and thereby igniting an air-fuel mixture within the engine cylinders. In this way, the spark timing is determined by the spark control signal Sspark.

The I/O circuit 13 includes a register which holds a signal representing a target spark advance angle, that is, a target spark timing. The I/O circuit 13 also includes a register which holds a signal representing a target dwell angle. The target advance angle signal and the dwell angle signal are compared to an output signal from a counter enumerating the crank angle position pulses S3. The counter is generally reset by the reference crank angle pulses S2. The output signal from the counter represents the actual crank angle position. When the actual crank angle moves into coincidence with the target spark timing, the spark control signal Sspark is adjusted to switch the power transistor 16 to allow the ignition device 15 to generate a spark. The spark control signal Sspark is also adjusted to switch the power transistor 16 in accordance with the comparison between the dwell angle signal and the output signal from the counter. As will be made clear hereinafter, the target spark timing is controlled in accordance with the engine speed, the engine intake-air flow rate, and the engine knock condition.

Figure 6:
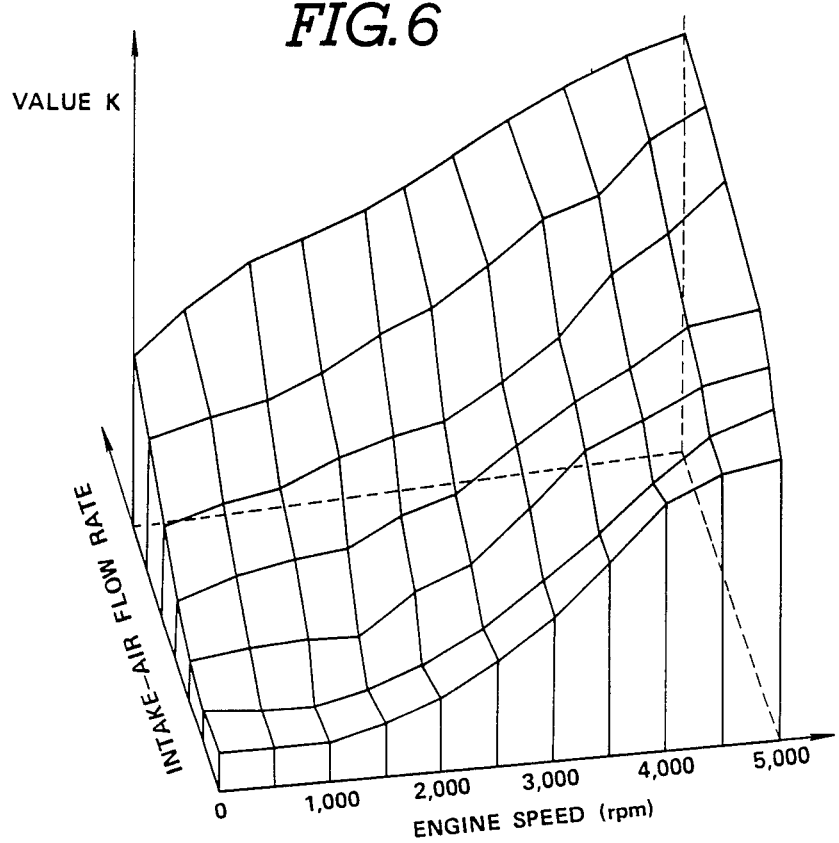
FIG. 6 is a graph of engine condition values K derived within the main control circuit of FIG. 1 which are plotted as a function of engine speed and engine intake-air flow rate.

It should be noted that the value K depends on conditions of combustion within each engine cylinder. Experiments reveal that in almost every engine, the value K is normally minimized when the engine is idling. In other words, the value K under engine conditions . except idling is larger than the value K under idling. FIG. 6 shows experimental results in a typical 4-cylinder engine. In FIG. 6, the detected values K are plotted as a function of the engine speed and the engine intake-air flow rate. As shown in FIG. 6, the value K is minimized when the engine is idling.

The main control circuit 8 derives a reference value Kmin which corresponds to the value K detected under engine idling. Under engine conditions except idling, the value K is normally greater than the reference value Kmin. The reference value Kmin is held in a section of the RAM 12 denoted by a preset address. The main control circuit 8 detects damage to the knock detection system, such as damage to the pressure sensors 1A-1D, damage to electrical connections to the sensors 1A-1D, and damage to the charge amplifiers 2A-2D, by comparing the current value K to the reference value Kmin. Specifically, under engine conditions except idling, such damage is detected when the value K becomes smaller than the reference value Kmin. It should be noted that under engine conditions except idling, the value K remains greater than the reference value Kmin as long as the knock detection system operates normally.

The reference value Kmin is calculated and updated by the following equation or program statement:

$$Kmin = (1-a)Kmin + aK$$

where K is the value obtained at the current engine idling and a is a preset constant between 0 and 1. In other words, $0 < a < 1$. In addition, the right-hand variable Kmin represents the preceding reference value while the left-hand variable Kmin represents the new reference value. The reference value Kmin may be equal to the value K obtained at the engine idling.

It should be noted that the value B may be used in place of the value K in detecting damage to the knock detection system.

Figure 7:
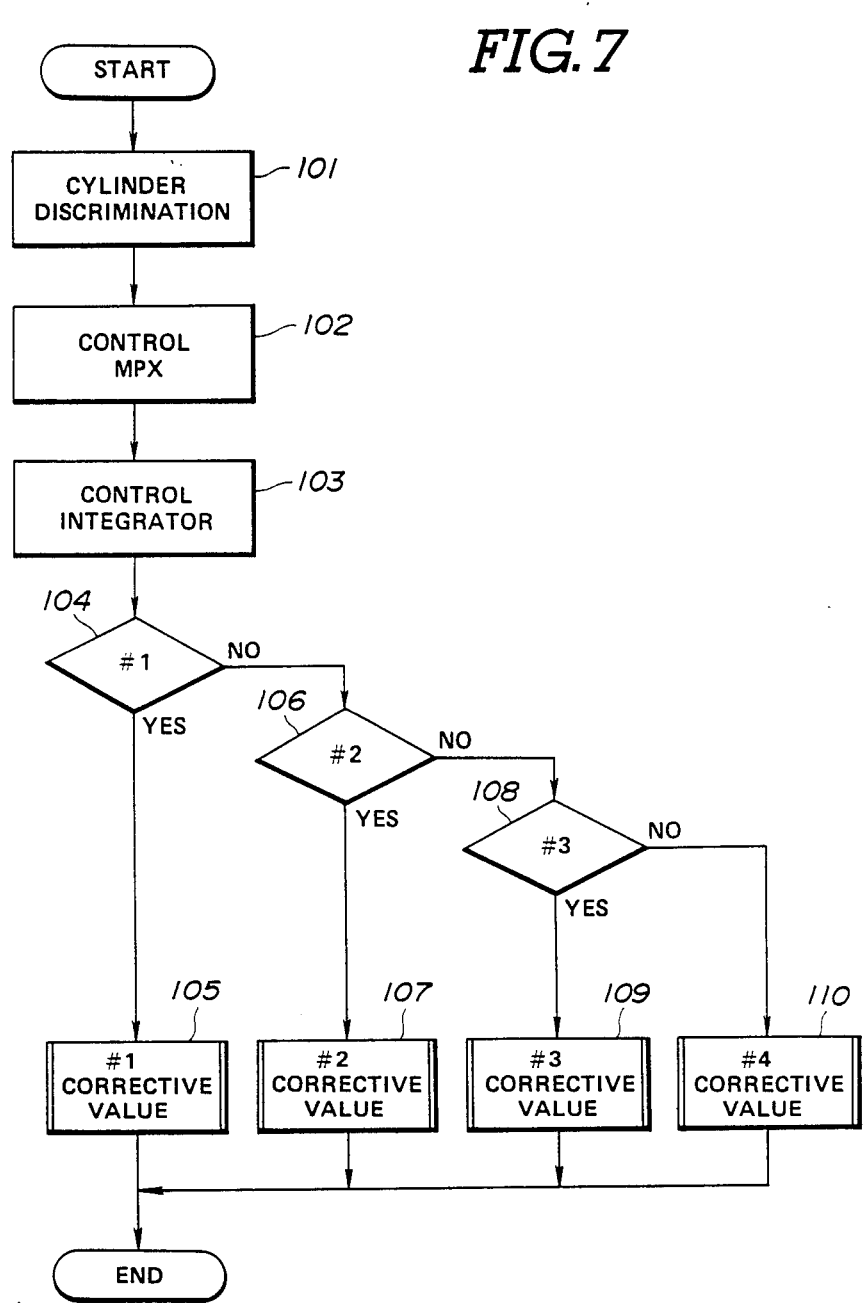
FIG. 7 is a flowchart of a first major section of a program operating the main control circuit of FIG. 1.

Operation of the main control circuit 8 will be described in more detail hereinafter. The main control circuit 8 operates in accordance with a program stored in the ROM 11. The program starts each time a reference crank angle pulse S2 occurs. FIG. 7 is a flowchart of a first major section of this program. A second major section of this program will be described hereinafter with reference to FIGS. 10 and 11.

As shown in FIG. 7, a first step 101 of the first major section of the program discriminates the engine cylinder which is denoted by the currently received reference pulse S2. First, the main control circuit 8 determines whether or not the currently received crank angle reference pulse S2 corresponds to the engine cylinder #1 in accordance with the duration of the reference pulse S2. As described previously, the duration of the reference pulse S2 for the engine cylinder #1 is longer than the duration of the reference pulses S2 for the other engine cylinders #2–#4. Specifically, the duration of the reference pulse S2 for the engine cylinder #1 is 14° in crank angle. The duration of the reference pulse S2 for the other engine cylinders #2-#4 is 4°-5° in crank angle. When the leading edge of a reference pulse S2 occurs, the main control circuit 8 sets an internal counter and thus orders the counter to start enumerating crank angle position pulses S3. The counter continues to enumerate position pulses S3 until the trailing edge of the reference pulse S2 occurs. Accordingly, immediately prior to or at the occurrence of the trailing edge of the reference pulse S2, an output from the counter indicates the detected duration of the reference pulse S2 in unit of a crank position pulse S3. The main control circuit 8 determines whether or not the currently received reference pulse S2 corresponds to the engine cylinder #1 in accordance with the detected duration of the reference pulse S2. Specifically, the detected duration of the reference pulse S2 is compared to a preset duration equal to 10° in crank angle. When the detected duration of the reference pulse S2 is greater than the preset duration, the main control circuit 8 recognizes that the current reference pulse S2 corresponds to the engine cylinder #1. When the detected duration of the reference pulse S2 is smaller than the preset duration, the main control circuit 8 recognizes that the current reference pulse S2 corresponds to the other engine cylinders #2-#4. The main control circuit 8 includes another counter which enumerates reference pulses S2 after the receipt of the reference pulse S2 corresponding to the engine cylinder #1. First, second, and third reference pulses S2 subsequent to the reference pulse S2 for the engine cylinder #1 correspond to the engine cyliders #3, #4, and #2 respectively in agreement with the spark order. The main control circuit 8 discriminates the engine cylinders #2-#4 in accordance with the counted number of the reference pulses S2 after the receipt of the reference pulse S2 corresponding to the engine cylinder #1.

A step 102 following the step 101 orders the multiplexer 6 via the signal Sch to select one of the pressure signals S21–S24 which corresponds to the engine cylinder discriminated by the step 101.

A step 103 following the stept 102 controls the integrator 7D within the signal processing circuit 7 via the set-reset signal Ssr. As described previously, the integrator 7D is ordered to integrate the signal S6 during a crank angle interval between BTDC 40° and TDC on the compression stroke and also during a crank angle interval between ATDC 5° and ATDC 45° on the compression stroke.

A step 104 following the step 103 determines whether or not the engine cylinder discriminated by the step 101 is #1. If the discriminated cylinder is #1, the program advances to a step 105. If the discriminated cylinder is not #1, the program advances to a step 106.

The step 106 determines whether or not the engine cylinder discriminated by the step 101 is #2. If the discriminated cylinder is #2, the program advances to a step 107. If the discriminated cylinder is not #2, program advances to a step 108.

The step 108 determines whether or not the engine cylinder discriminated by the step 101 is #3. If the discriminated cylinder is #3, the program advances to a step 109. If the discriminated cylinder is not #3, the program advances to a step 110.

In this way, when the discrimiated cylinder is #1, #2, #3, and #4, the program advances the steps 105, 107, 109, and 110 respectively. These steps 105, 107, 109, and 110 adjust spark timings of the engine cyliners #1, #2, #3, and #4 respectively. After the steps 105, 107, 109, and 110, the first major section of the program ends.

Figure 8:
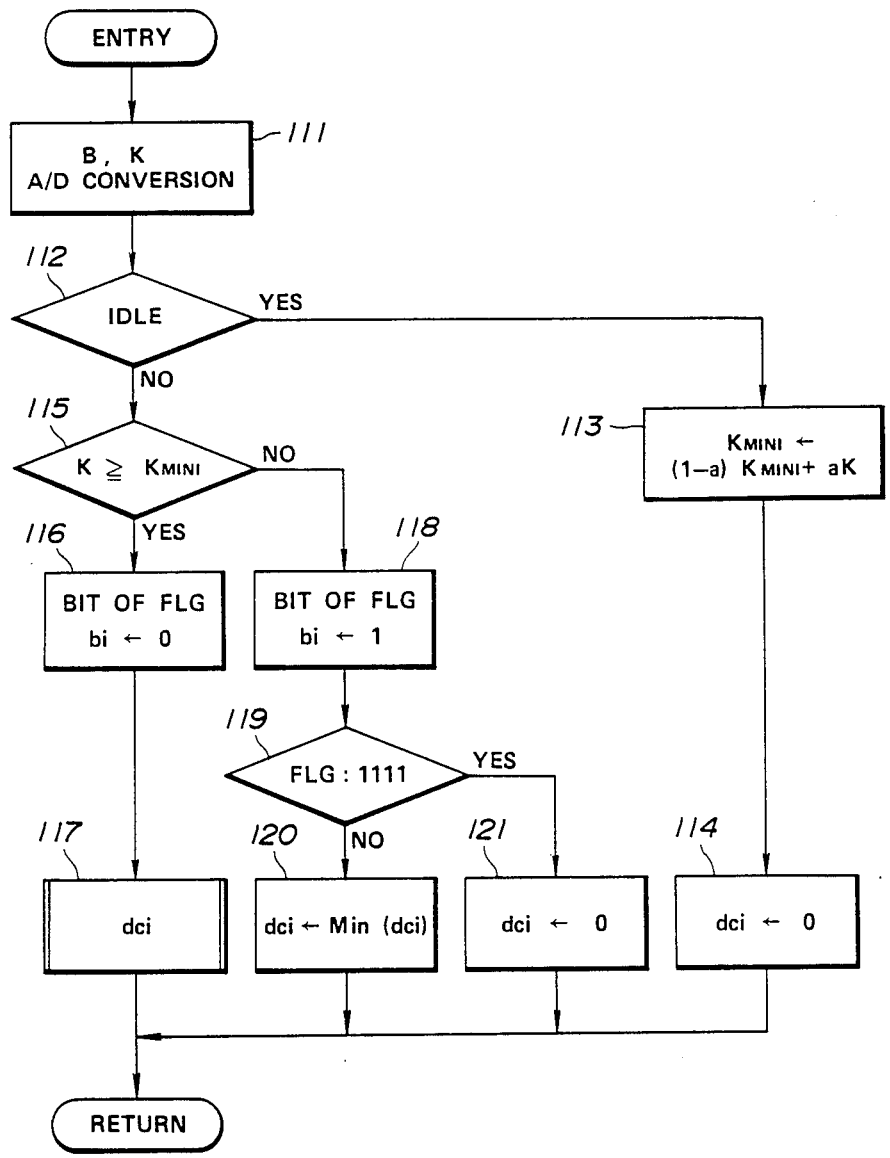
FIG. 8 is a flowchart of an internal program of the spark timing adjustment steps of FIG. 7.

FIG. 8 is a flowchart of an internal program of the spark timing adjustment steps 105, 107, 109, and 110 corresponding to an engine cylinder #i (i=1, 2, 3, or 4).

In the program of FIG. 8, a flag or variable FLG held by the RAM 12 has four bits b0, b1, b2, and b3 which represent whether or not the knock detection systems for the engine cylinders #1, #2, #3, and #4 operate normally, respectively.

A variable dci (i=1, 2, 3, and 4) represents a spark timing corrective value. The variables dc1, dc2, dc3, and dc4 correspond to the engine cylinders #1, #2, #3, and #4 respectively. A positive value dci induces an advance of spark timing. A negative value dci induces a retardation of spark timing. Accordingly, as the spark timing corrective value dci increases, the spark timing advances.

A variable Min (dci) represents the most retarded one of the spark timing corrective values dci, that is, the smallest of the spark timing corrective values dci, corresponding the engine cylinders other than the present engine cylinder. For example, in the case where the program of FIG. 8 corresponds to the engine cylinder #1, the variable Min (dci) represents the smallest of the spark timing corrective values dci corresponding to the engine cylinders #2-#4.

A variable Kmini (i=1, 2, 3, and 4) represents a reference value which corresponds to the combustion condition value K detected when the engine is idling. The variables Kmin1, Kmin2, Kmin 3, and Kmin4 correspond to the engine cylinders #1, #2, #3, and #4 respectively.

A variable a represents a corrective constant or factor between 0 and 1. In other words, $0 < a < 1$.

As shown in FIG. 8, a step 111 following an entry port derives the digital value B by analog-to-digital conversion of the signal S7 outputted by the signal processing circuit 7. Specifically, the voltage of the signal S7 at the TDC on the compression stroke is converted into the corresponding digital value which is written in the variable B. In addition, the step 111 derives the digital value K by analog-to-digital conversion of the signal S7 outputted by the signal processing circuit 7. Specifically, the voltage of the signal S7 at the ATDC 45° on the compression stroke is converted into the corresponding digital value which is written in the variable K.

A step 112 following the step 111 detects whether or not the engine is idling on the basis of the idle signal Si. If the engine is idling, the program advances to a step 113. If the engine is not idling, the program advances to a step 115.

The step 113 updates the reference value Kmini corresponding to the engine condition value K during idling operation of the engine cylinder #i. Specifically, the step 113 executes the following statement or equation:

$$Kmini=(1-a)Kmini+aK$$

It should be noted that in this statement, the right-hand Kmini represents the preceding value and the left-hand Kmini represents the new value.

A step 114 following the step 113 sets the spark timing corrective value dci equal to 0. In this way, when the engine is idling, the spark timing corrective value dci remains zero. Accordingly, when the engine is idling, the spark timing is controlled independent of the spark timing corrective value. As will be made clear hereinafter, during engine idling, the spark timing is adjusted in exact agreement with a basic target spark timing. After the step 114, the program advances to a return port.

The step 115 compares the combustion condition value K to the reference value Kmini which corresponds to the value K during engine idling. If the combustion condition value K is equal to or greater than the reference value Kmini, that is, if the knock detection system for the engine cylinder #i operates normally, the program advances to a step 116. If the combustion condition value K is smaller than the reference value Kmini, that is, if the knock detection system for the engine cylinder #i malfunctions, the program advances to a step 118.

In the step 116, the bit of the flag FLG corresponding to the engine cylinder #i is set to "0". In cases of engine cylinders #1, #2, #3, and #4, the bits b0, b1, b2, and b3 are set to "0" respectively.

Accordingly, when the knock detection system for the engine cylinder #i operates normally, the bit of the flag FLG corresponding to the engine cylinder #i is A step 117 following the step, 116 derives a spark timing corrective value dci for the engine cylinder #i. After the step 117, the progam advances to the return port.

In the step 118, the bit of the flag FLG corresponding to the engine cylinder #i is set to "1". In cases of engine cylinders #1, #2, #3, and #4, the bits b0, b1, b2, and b3 are set to "1" respectively.

Accordingly, when the knock detection system for the engine cylinder #i malfunctions, e.g., when the pressure sensor or the charge amplifier for the engine cylinder #i is damaged, the bit of the flag FLG corresponding to the engine cylinder #i is "1".

A step 119 following the step 118 detects whether or not all the bits of the flag FLG are "1", that is, whether or not all the knock detection systems for the engine cylinders #1–#4 malfunction. If at least one of the bits of the flag FLG is not "1", that is, if at least one of the knock detection systems operates normally, the program advances to a step 220. If all the bits of the flag FLG are "1", that is, if all the knock detection systems malfunction, the program advances to a step 121.

The step 120 sets the spark timing corrective value dci equal to the value Min (dci) which is the smallest of the values dci for the engine cylinders connecting to the normally operating knock detection systems. In this way, the spark timing corrective value dci for the engine cylinder connecting to the damaged or wrong knock detection system is set equal to the spark timing corrective value for the engine cylinder connecting to the normal knock detection system and exposed to most retarded spark timing. As a result of spark timing control described hereinafter, the engine cylinder exposed to most retarded spark timing has original characteristics easiest to produce a knock. After the step 120, the program advances to the return port.

The step 121 sets the spark timing corrective value dci to 0. In this way, when all the knock detection systems malfunction, the spark timing corrective velue dci is zero. As will be made clear hereinafter, in this case, the spark timing is adjusted in exact agreement with a basic target spark timing. After the step 121, the program advances to the return port.

Figure 9:
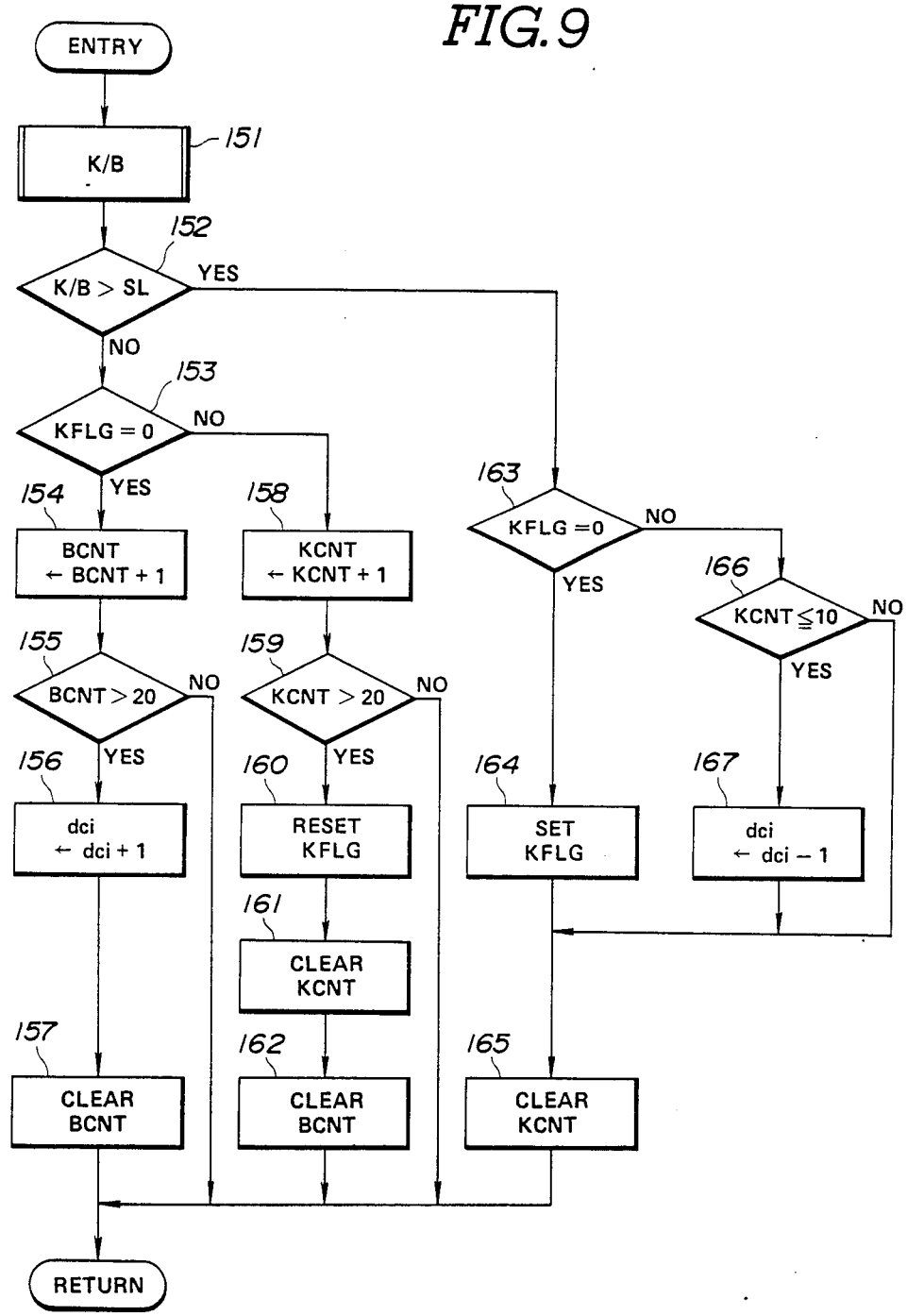
FIG. 9 is a flowchart of an internal program of the spark-timing corrective value derivation step of FIG. 8.

FIG. 9 is a flowchart of an internal program of the corrective value derivation step 117.

In the program of FIG. 9, a character SL represents a reference value for knock detection.

A flag or variable KFLG represents whether or not an engine knock occurs. The flag KFLG is provided for each engine cylinder.

A count variable BCNT represents the number of spark times after the flag KFLG is reset. The variable BCNT is provided for each engine cylinder.

A count variable KCNT represents the number of spark times after the flag KFLG is set. The variable KCNT is provided for each engine cylinder.

As shown in FIG. 9, a step 151 following an entry port calculates the ratio between the engine knock level K and the background noise level B, that is, the ratio K/B. It should be noted that the step 151 may calculate the ratio between the engine knock level K and the average engine knock level Kave, that is, the ratio K/Kave, in place of the ratio K/B.

A step 152 following the step 151 compares the ratio K/B to the reference value SL. This reference value SL is chosen to correspond to the boundary between a knock generating range and a non-knock range. If the ratio K/B exceeds the reference value SL, that is, if an engine knock occurs, the program advances to a step 163. If the ratio K/B does not exceed the reference value SL, that is, if any engine knock does not occur, the program advances to a step 153.

The step 153 detects whether or not the flag KFLG is "0". As will be made clear hereinafter, the flag KFLG generally chages from "0" to "1" when an engine knock occurs. If the flag KFLG is "0", that is, if any engine knock does not occur, the prorgam advances to a step 154. If the flag KFLO is "1", that is, if an engine knock occurs previously, the program advances to a step 158.

The step 154 increments the count number BCNT by "1". After the step 154, the program advances to a step 155.

The step 155 compares the count number BCNT to "20". If the count number BCNT exceeds "20", the program advances to a step 156. If the count number BCNT does not exceed "20", the program advances to a return port.

The step 156 increases the spark timing corrective value dci by a unit corresponding to 1° in crank angle. As will be made clear hereinafter, this increase in the value dci induces an advance of the spark timing by 1° in crank angle.

A step 157 following the step 156 clears the count number BCNT to "0". After the step 157, the program advances to the return port.

Thus, the steps 53–57 cooperate to advance the spark timing of an engine cylinder #i by 1° in crank angle in cases where after the occurrence of the last knock in the engine cylinder #i, the ratio K/B remains equal to or less than the reference value SL for more than 20 operation cycles of the engine cylinder #i. It should be noted that the ratio K/B is equal to or less than the reference value SL when any engine knock does not occur.

The step 158 increments the count number KCNT by "1". After the step 158, the program advances to a step 159.

The step 159 compares the count number KCNT to "20". If the count number KCNT exceeds "20", the program advances to a step 160. If the count number KCNT does not exceed "20", the program goes to the return port.

The step 160 resets the flag KFLG to "0".

A step 161 following the step 160 clears the count number KCNT to "0".

A step 162 following the step 161 clears the count number BCNT to "0". After the step 162, the program advances to the return port.

The steps 158-162 cooperate to change the flag KFLG, the count number KCNT, and the count number BCNT to "0" in cases where after the ratio K/B becomes equal to or less than the reference value SL, the ratio remains equal to or less than the reference value SL for more than 20 operation cycles of an engine cylinder #i.

The step 163 detects whether or not the flag KFLG is "0", that is, whether or not the engine knock detected by the previous step 152 is the first. If the flag KFLG is "0", that is, if the knock is the first, the program advances to a step 164. If the flag KFLG is "1", that is, if the knock is not the first, the program advances to a step 166.

The step 164 sets the flag KFLG to "1". Accordingly, when an engine knock is detected firstly, the flag KFLG changes to "1". After the step 164, the program advances to a step 165.

The step 165 clears the count number KCNT to "0". After the step 165, the program advances to the return port.

The step 166 compares the count number KCNT to "10". If the count number KCNT is greater than "10", the program advances to the step 165. If the count number KCNT is equal to or less than "10", the program advances to a step 167.

The setp 167 decrements the spark timing corrective value dci by a unit corresponding to 1° in crank angle. As will be made clear hereinafter, this decrease in the value dci induces a retardation of the spark timing of the engine cylinder #1 by 1° in crank angle. After the step 167, the program advances to the step 165.

Thus, the steps 166 and 167 cooperate to retard the spark timing of an engine cylinder #i by 1° in crank angle in cases where after the occurrence of the last knock in the engine cylinder #i, the ratio K/B exceeds the reference value SL again and thus a subsequent engine knock occurs within a period equal to or less than 10 operation cycles of the engine cylinder #i. Accordingly, the spark timing is adjusted in accordance with the frequency of the occurrence of engine knock.

The program may include an additional step which limits the spark timing corrective value dci to prevent the spark timing from advancing and retarding by more than a preset value. This limiting step includes a substep detecting whether or not the spark timing corrective value dci exceeds a preset constant.

The unit of increment and decrement in the spark timing corrective value dci used in the steps 156 and 167 may be other than 1° in crank angle. For example, this unit may be ½° or ¼° in crank angle. Furthermore, this unit may depend on the ratio K/B, that is, on the intensity of engine knock.

Figure 10:
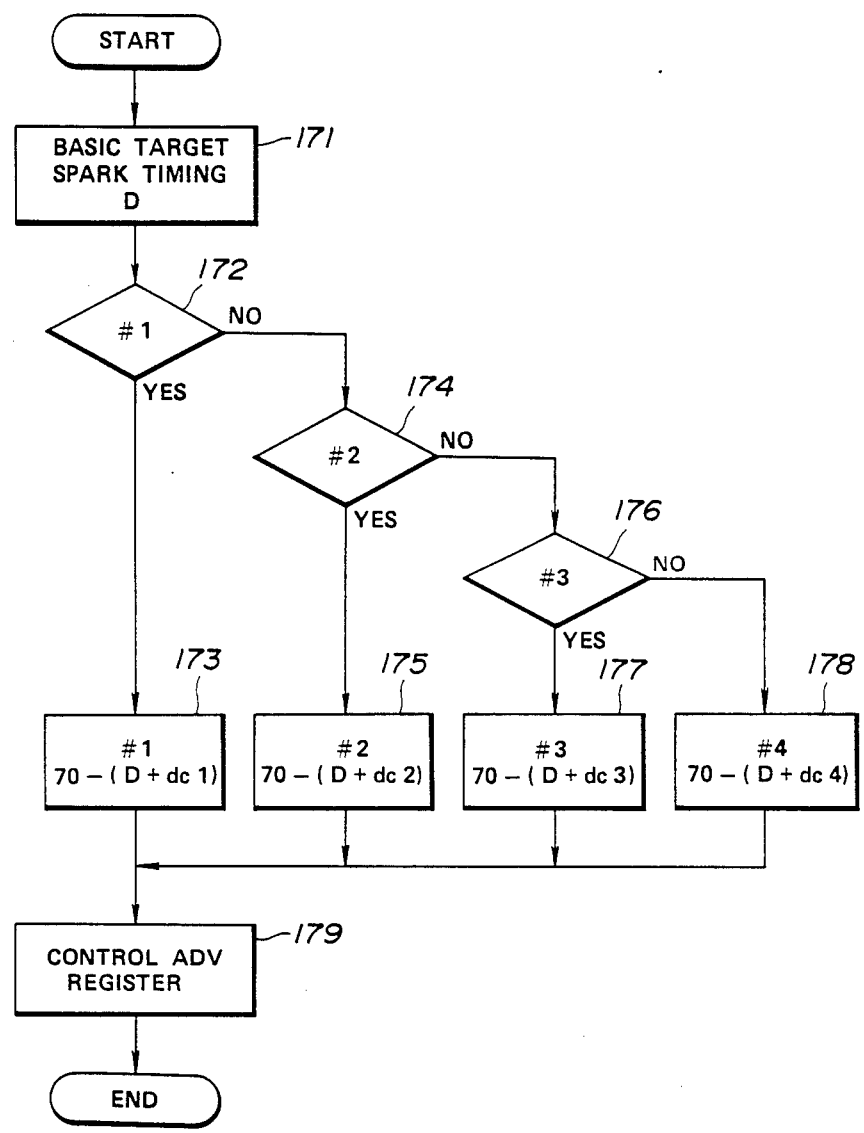
FIG. 10 is a flowchart of a second major section of a program operating the main control circuit of FIG. 1.

FIG. 10 is a flowchart of the second major section of the program. The second major section of the program is executed after the first major section of the program of FIG. 7.

As shown in FIG. 10, a first step 171 of the second major section of the program determines a basic target spark timing value D in accordance with the current values of engine intake-air flow rate and engine speed. The engine intake-air flow rate is detected by a sensor (not shown) disposed in an engine intake-air passage. The engine speed is derived from the crank angle pulses S2 or S3 in a known way.

Figure 11:
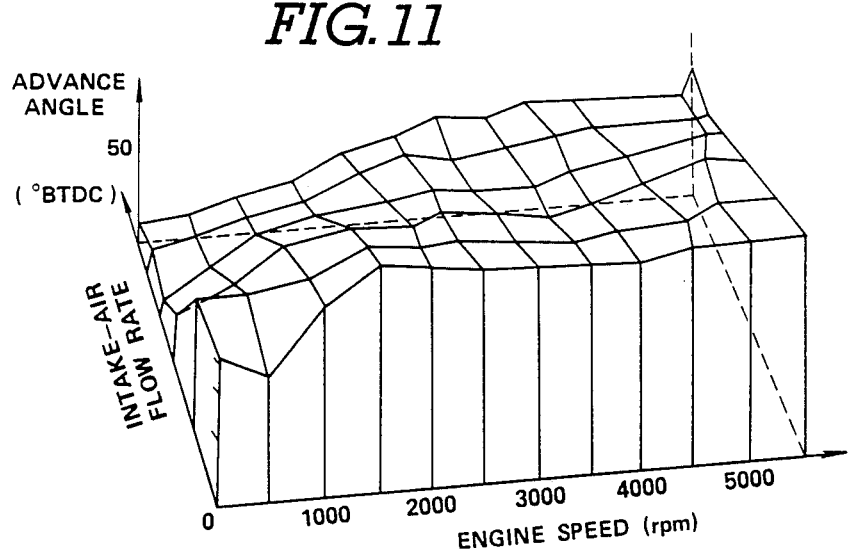
FIG. 11 is a graph of basic target spark timings used in the program of FIG. 10 which are plotted as a function of engine intake-air flow rate and engine speed.

FIG. 11 is a diagram of a table in which a set of basic target spark timing values are plotted as a function of engine intake-air flow rate and engine speed. This table is held by the ROM 11. The basic target spark timing value D is determined by referring to this table.

A step 172 following the step 171 determines whether or not the engine cylinder discriminated by the step 101 (see FIG. 7) is #1. If the discriminated cylinder is #1, the program advances to a step 173. If the discriminated cylinder is not #1, the program advances to a step 174.

The step 174 determines whether or not the engine cylinder discriminated by the step 101 (see FIG. 7) is #2. If the discriminated cylinder is #2, the program advances to a step 175. If the discriminated cylinder is not #2, the program advances to a step 176.

The step 176 determines whether or not the engine cylinder discriminated by the step 101 (see FIG. 7) is #3. If the discriminated cylinder is #3, the program advances to a step 177. If the discriminated cylinder is not #3, the program advances to a step 178.

In this way, when the discrimiated cylinder is #1, #2, #3, and #4, the program advances to the steps 173, 175, 177, and 178 respectively. These steps 173, 175, 177, and 178 determine final target spark timing vlues STfin1, STfin2, STfin3, and STfin4 for the engine cyliners #1, #2, #3, and #4 respectively.

Specifically, in the steps 173, 175, 177, and 178, the final spark timing value STfini (i=1, 2, 3, and 4) is calculated from the basic target spark timing value D and the spark timing corrective velue dci by referring to the following equation:

$$STfini = 70 - (D + dci)$$

This equation converts BTDC(D+dci) to an angle starting from the moment of the occurrence of the reference crank angle pulse S2.

After the steps 173, 175, 177, and 178, the program advances to a step 179 which outputs and loads the final spark timing value STfini into the spark advance angle register corresponding to the engine cylinder #i. As a result, a spark is generated within the engine cylinder #i at a moment coincident with the final target spark timing value STfini.

As described previously, in this engine control system, a malfunction of the knock detection device for an engine cylinder is detected when the engine condition value K for the engine cylinder becomes smaller than the reference value Kmin corresponding to the value during engine idiling. When such a malfunction is detected, the spark timing of the engine cylinder connecting to the wrong knock detection device is controlled in accordance with the spark timing of an engine cylinder connecting to a normal knock detection device or is controlled in exact agreement with the basic target spark timing. This fail-safe arrangement prevents a considerable decrease in the engine performance.

Specifically, the spark timing of the engine cylinder connecting to the wrong knock detection device is controlled in accordance with the most retarded spark timing of the engine cylinder connecting to the normal knock detection device. This feature reliably prevents the occurrence of a knock in the engine cylinder connecting to the wrong knock detection device.

When all the knock detection devices malfunction, the spark timings for all the engine cylinders are controlled in exact agreement with the basic target spark timing. Since the basic target spark timing is sufficiently retarded relative to the knock generating limit, the occurrence of engine knock is prevented reliably when all the knock detection devices malfunction.

This invention may be applied to an engine in which engine cylinders are divided into groups and in which spark timings are controlled for the respective cylinder groups.

What is claimed is:

1. In an internal combustion engine wherein a spark timing control device adjusts spark timing in accordance with detected value of vibration in combustion pressure, an engine control system comprising;
    (a) means for detecting vibration in combustion pressure within the engine;
    (b) means for converting the detected combustion pressure vibration into a correlation value relating to combustion condition of the engine;
    (c) means for determining whether or not a malfunction of the spark timing control device occurs by comparing the current correlation value to a reference value corresponding to the correlation value which was obtained during engine idling; and
    (d) means for controlling the spark timing in accordance with the detected combustion pressure vibration and also with the determination as to whether or not a malfunction of the spark timing control device occurs.

2. The system of claim 1, wherein the determining means comprises means for rectifying and integrating the detected combustion pressure vibration during an interval corresponding to combustion to obtain the correlation value.

3. A control system for an engine having first and second cylinders, the system comprising:
    (a) a first device for detecting whether or not a knock occurs in the first engine cylinder on the basis of pressure within the first engine cylinder and generating a first signal indicative thereof;
    (b) means for controlling spark timing of the first engine cylinder in accordance with the first signal;
    (c) a second device for detecting whether or not a knock occurs in the second engine cylinder on the basis of pressure within the second engine cylinder and generating a second signal indicative thereof;
    (d) means for controlling sptark timing of the second engine cylinder in accordance with the second signal;
    (e) means for detecting whether or not the first device malfunctions;
    (f) means for detecting whether or not the second device malfunctions; and
    (g) means for, when the first device malfunctions but the second device operates normally, controlling the spark timing of the first engine cylinder in accordance with the second signal independent of the first signal.

4. The system of claim 3, further comprising means for, when the second device malfunctions but the first device operates normally, controlling the spark timing of the second engine cylinder in accordance with the first signal independent of the second signal.

5. The system of claim 3, further comprising means for generating a third signal independent of the first and second signals, and means for, when both of the first and second devices malfunction, controlling the spark timings of the first and second engine cylinders in accordance with the third signal independent of the first and second signals.

6. The system of claim 3, wherein the first device comprises:
    (a) means for detecting pressure within the first engine cylinder and generating a pressure signal indicative thereof;
    (b) means for abstracting components of the pressure signal which have frequencies within a preset range;
    (c) means for rectifying the abstracted components and generating a rectification signal indicative thereof; and
    (d) means for integrating the rectification signal during a preset interval of crank angle of the first engine cylinder and generating an integration signal indicative thereof;
and wherein the first device malfunction detecting means comprises:
    (a) means for detecting idling operation of the engine;
    (b) means for generating a reference signal in accordance with the integration signal which is obtained during the detected idling operation of the engine;
    (c) means for comparing the current integration signal and the reference signal to detect a malfunction of the first device.

7. A system for an engine, comprising;
    (a) a device for detecting whether or not a knock occurs in the engine on the basis of pressure within the engine and generating a knock signal indicative thereof;
    (b) means for controlling spark timing of the engine in accordance with the knock signal;
    (c) means for detecting pressure within the engine and generating a pressure signal indicative thereof;
    (d) means for abstracting components of the pressure signal which have frequencies within a preset range;
    (e) means for rectifying the abstracted components and generating a rectification signal indicative thereof;
    (f) means for integrating the rectification signal during a preset interval of crank angle of the engine and generating a integration signal indicative thereof;
    (g) means for detecting idling operation of the engine;
    (h) means for generating a reference signal in accordance with the integration signal which is obtained during the detected idling operation of the engine;
    (i) means for comparing the current integration signal and the reference signal; and
    (j) means for detecting a malfunction of the device in accordance with the comparison between the current integration signal and the reference signal.

* * * * *